3,150,979
METHOD OF PROVIDING A FEED SUPPLEMENT FOR RUMINANTS
Clifford O. Ensley, Tualitin, Oreg.
(1000 SW. Vista, Portland, Oreg.)
No Drawing. Filed Sept. 5, 1961, Ser. No. 135,795
1 Claim. (Cl. 99—9)

My invention relates to a supplement to be added to the basal feed of cattle and sheep.

My invention has two principal objectives among others:

(1) To create in cattle and sheep a desire to eat more, and (2) To enable the cattle and sheep to better assimilate the food that they do eat.

How these two principal objectives are accomplished follows.

I first build up what I term a basic starter and with that I proceed to build up a culture and with that I build up a formula for a feed supplement.

The basic starter includes starch, sugar, $H_2O$, young grass, and preferably a trace of various minerals.

As to the starch, starch may be derived from grains or even potatoes and the like.

As to the sugar, while any type may do I generally use corn sugar because I get a better bacteria growth.

As to the $H_2O$, this may vary from 70 to 105 degrees Fahrenheit depending upon the weather.

As to the young green grass, I have used blue grass and the fescues, as well as oat, wheat, and barley grass, in the boot stage, which is the growth before it reaches the first joint.

As to the minerals, these are trace minerals generally found in minute quantities in various soils and include among others, iron, zinc, copper, and manganese.

In the starter I use 8 oz. of young grass, 4 oz. of sugar, and 16 oz. of starch. To the above and to the minerals, if included, I add $H_2O$ sufficient to provide a moist mixture. This mixture is placed in an incubator and allowed to ferment which takes from 48 to 72 hours depending upon weather and other conditions.

When fermented, I divide the starter into three batches and bring all three up to the same degree of sweetness which one soon learns to gauge by smell. The control is through the addition of starch and/or sugar. Salt helps to control any mold spores that form.

The starter in the amount disclosed is sufficient to make three batches of culture. A batch of culture includes 9 oz. of starter, 32 oz. of young grass, 72 oz. of sugar, 128 oz. of starch, and sufficient $H_2O$ to make a moist mix. The amounts given may vary as much as 5% either way.

The culture is allowed to incubate approximately 48 hours at 75 to 105 degrees Fahrenheit depending a lot upon the weather, after which it is dehydrated. This may be accomplished in a dryer or by spreading a layer of the culture on screens placed one above the other and over and through which warm air is circulated. When dry, a culture is put through grinders to pulverize it. The means used should not heat the mixture.

One reason for dividing the starter into three batches is for ease in handling and controlling the make-up.

Basal feed for cattle and sheep varies from feed lot to feed lot during the year. For instance, a feeder might feed milo today and next month corn fodder. In which event I temper my culture using milo starch in the culture where milo is the basal feed and corn meal as the starch source when corn fodder is the basal feed. While it is not imperative that I use ground milo as the starch source when milo is being fed or corn meal as the starch source when corn is being fed, I find that the culture develops better and is better liked by the stock when the starch source corresponds with the basal feed. Before dehydrating each culture I add traces of calcium carbonate, phosphorus, iron carbonate, zinc sulphate, manganese sulfate, cobalt carbonate, potassium iodide, magnesium sulphate, nickle carbonate, and boron borate. I also add vitamins A, $D_2$, $D_3$, $B_{12}$, and choline, niacin, riboflavin, and pantothenic acid. The above listed minerals total about 6 oz. while the other items total about 2 oz.

One may make up culture #1 with milo as the starch content, #2 with corn meal as the starch content, and #3 with barley or wheat middlings as the starch content. It is quite apparent that all cultures may be made with like starch content if desired.

After dehydrating and powdering a culture I add to 10# of the same the following carrier the whole constituting a formula. The preferred carrier is made up of the following: dehydrated grass 157#, barley sprouts 210#, 2½# coated crab solution 300#, feather meal 160#, Nutrilass 150#, rice polish 180#, kelp meal 100#, tricalcium phosphate 300#, Formula P 100#, lime 300#, vitamin A (palmitate) 12¼#, vitamin $D_2$ ¾#, 50% choline 10#, live yeast 1#, and the following minerals which have a total weight of 9#. Thus a formula weighs out at 2000#. This is sacked when dry.

The usual mineral content includes dicalciumphosphate, tricalciumphosphate, calcium carbonate, manganese sulphate, copper oxide, cobalt carbonate, iron carbonate, zinc sulphate, and sodium borate.

I sometimes find it necessary and/or advisable to substitute some of the above ingredients and have used ground corn meal, wheat middlings, distillers' grains and solubles, and fish meal and fish solubles. However, I aim to provide not less than 18% of crude proteins and 2% of crude fat. I also aim to keep the crude fiber content to 8% and the crude ash to 32%.

2 oz. of the preferred formula is fed each day per head of cattle and 0.2 oz. per head of sheep.

When fed my formula, the micro-organisms in the rumen appear to be better able to use the food eaten. While the formula is sometimes offensive to people it does not appear to be obnoxious to cattle and sheep who really relish it especially when it contains grape pumice with dried molasses, "Nutrilass."

The small amount of my formula fed per day per animal does not provide basal food but appears to permit the enzymes present to step up the change of food into meat. As a consequence, after a six months' trial in various Pacific States we have been able to stimulate animal growth an average of 20%.

The formula, in addition to promoting growth, tends to promote better health, as toning up the liver.

What has been disclosed in the prior art is set forth in the appended claim.

I claim:

The method of providing a feed supplement for ruminants which includes:

(1) Forming a fermented starter which comprises (a) mixing 8 ounces of grass in the boot stage, 4 ounces of sugar, 16 ounces of starch, with sufficient water to bring about fermentation of the starter and (b) fermenting said starter, (2) Forming a fermented culture which comprises (a) mixing one third of said fermented starter with 32 ounces of grass in the boot stage, 72 ounces of sugar, 128 ounces of starch, with sufficient water to bring about fermentation of the culture and (b) fermenting said culture,
(3) Dehydrating and finely grinding said culture,
(4) Mixing the finely ground fermented culture with a carrier which includes a plurality of ingredients providing at least 18% of crude protein and 2% of crude fat, minerals and vitamins, to form a batch of the feed supplement to weigh out 2000 pounds.

References Cited in the file of this patent

UNITED STATES PATENTS

| | | |
|---|---|---|
| 1,885,411 | Brown | Nov. 1, 1932 |
| 2,256,914 | Whitcomb | Sept. 23, 1941 |
| 2,690,969 | Pascale | Oct. 5, 1954 |

FOREIGN PATENTS

| | | |
|---|---|---|
| 511,525 | Great Britain | Aug. 21, 1939 |